United States Patent [19]

Anderson

[11] Patent Number: 5,149,551

[45] Date of Patent: Sep. 22, 1992

[54] APPARATUS FOR AND METHOD OF DISPENSING FOOD PRODUCT SUCH AS HARD ICE CREAM

[75] Inventor: David B. Anderson, St. George, Utah

[73] Assignee: Quixpenser, Inc., Salt Lake City, Utah

[21] Appl. No.: 605,975

[22] Filed: Oct. 30, 1990

[51] Int. Cl.[5] .......................................... B29C 47/92
[52] U.S. Cl. .................................. 426/231; 62/342;
222/335; 222/342; 264/40.1; 264/40.5;
264/40.7; 425/118; 425/145; 425/202; 425/276;
426/389; 426/512; 426/518; 426/524
[58] Field of Search ................... 264/40.5, 40.6, 40.7,
264/40.1, 28, 330; 222/1, 80, 335, 342; 425/202,
204, 118, 276–278, 143, 145; 426/516, 524, 393,
389, 512, 231, 418, 518; 62/342, 340, 341

[56] References Cited

U.S. PATENT DOCUMENTS

| | | | |
|---|---|---|---|
| 1,640,126 | 8/1927 | Knox et al. | 425/308 |
| 2,032,961 | 3/1936 | Vogt | 425/204 |
| 2,109,598 | 3/1938 | Stasinski et al. | 425/278 |
| 2,558,887 | 7/1951 | Tesiero | 425/143 |
| 2,579,096 | 12/1951 | Schulz | 425/376.1 |
| 2,651,186 | 9/1953 | Murphy | 62/342 |
| 2,719,494 | 10/1955 | Spiess, Jr. et al. | 425/145 |
| 2,728,306 | 12/1955 | Tarr | 426/516 |
| 4,420,948 | 12/1983 | Savage | 425/276 |
| 4,707,997 | 11/1987 | Bigler et al. | 264/28 |
| 4,796,784 | 1/1989 | Spirk et al. | 222/80 |

FOREIGN PATENT DOCUMENTS

| | | | |
|---|---|---|---|
| 2813349 | 10/1978 | Fed. Rep. of Germany | 62/340 |
| 63-263051 | 10/1988 | Japan | 62/340 |

Primary Examiner—Jeffery Thurlow
Attorney, Agent, or Firm—Senniger, Powers, Leavitt & Roedel

[57] ABSTRACT

Apparatus for automatically dispensing food product such as hard food product, having a refrigerated container for holding a supply of food product, a chamber adjacent the container for receiving food product and for delivery therefrom of a serving portion of food product, and a mechanism in the container for removing food product from the supply for delivery to the chamber thereby to pack the chamber with food product. A method of dispensing food product such as hard ice cream is also disclosed.

49 Claims, 9 Drawing Sheets

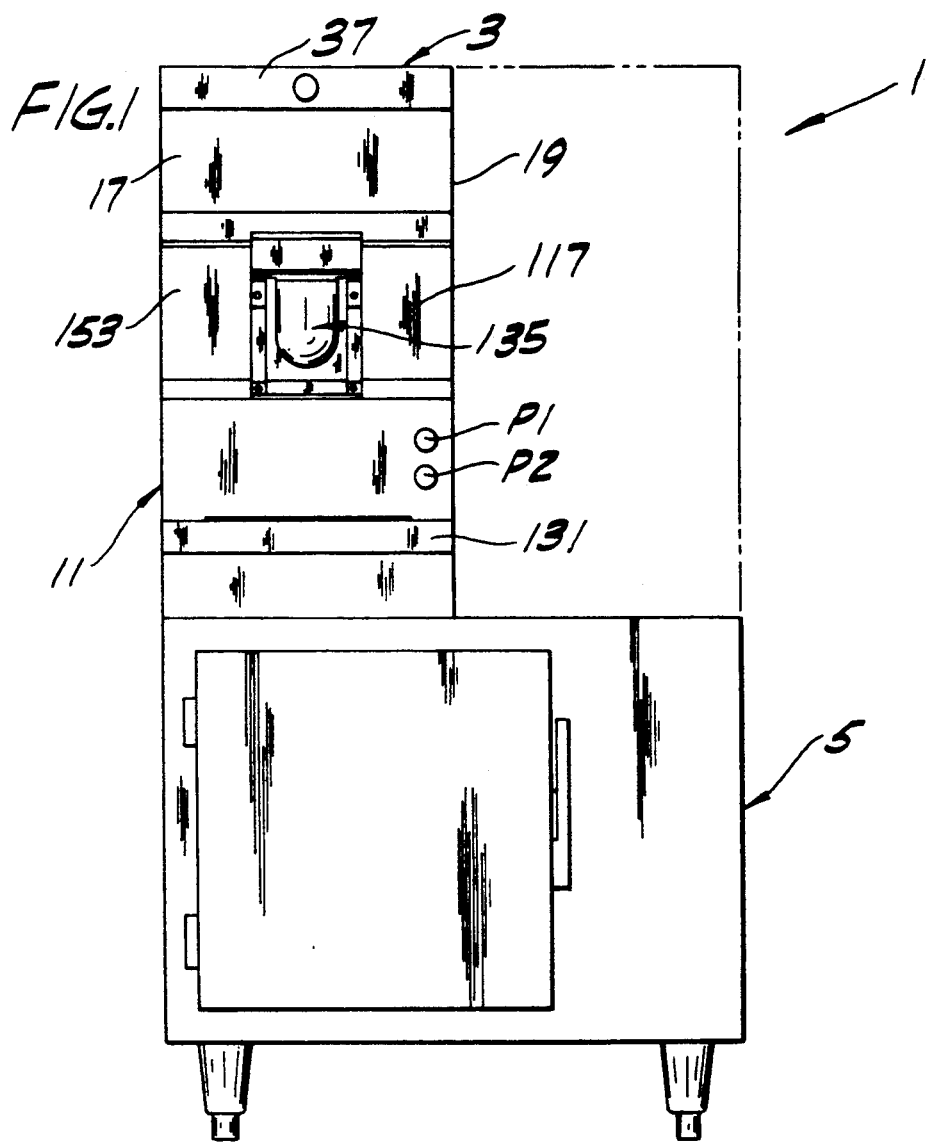
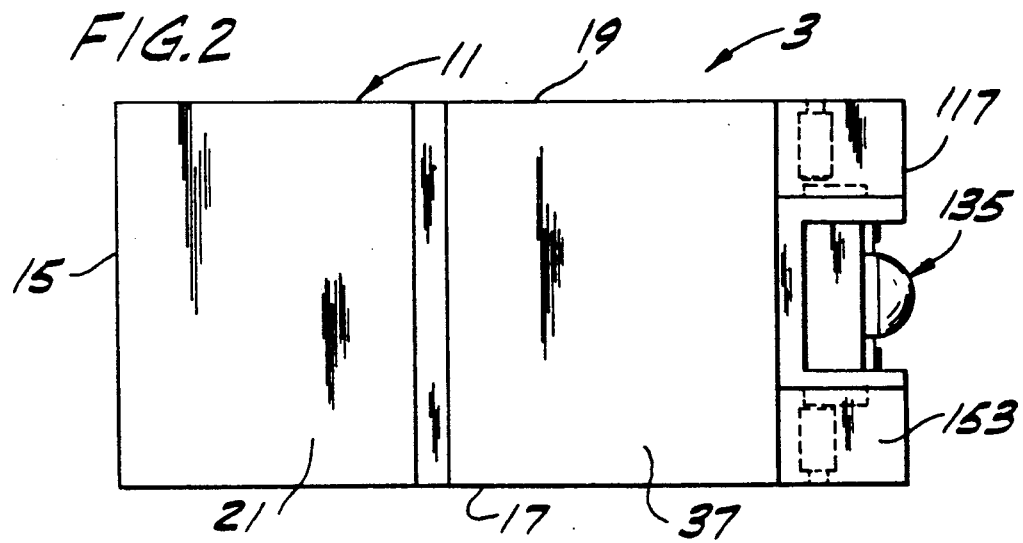

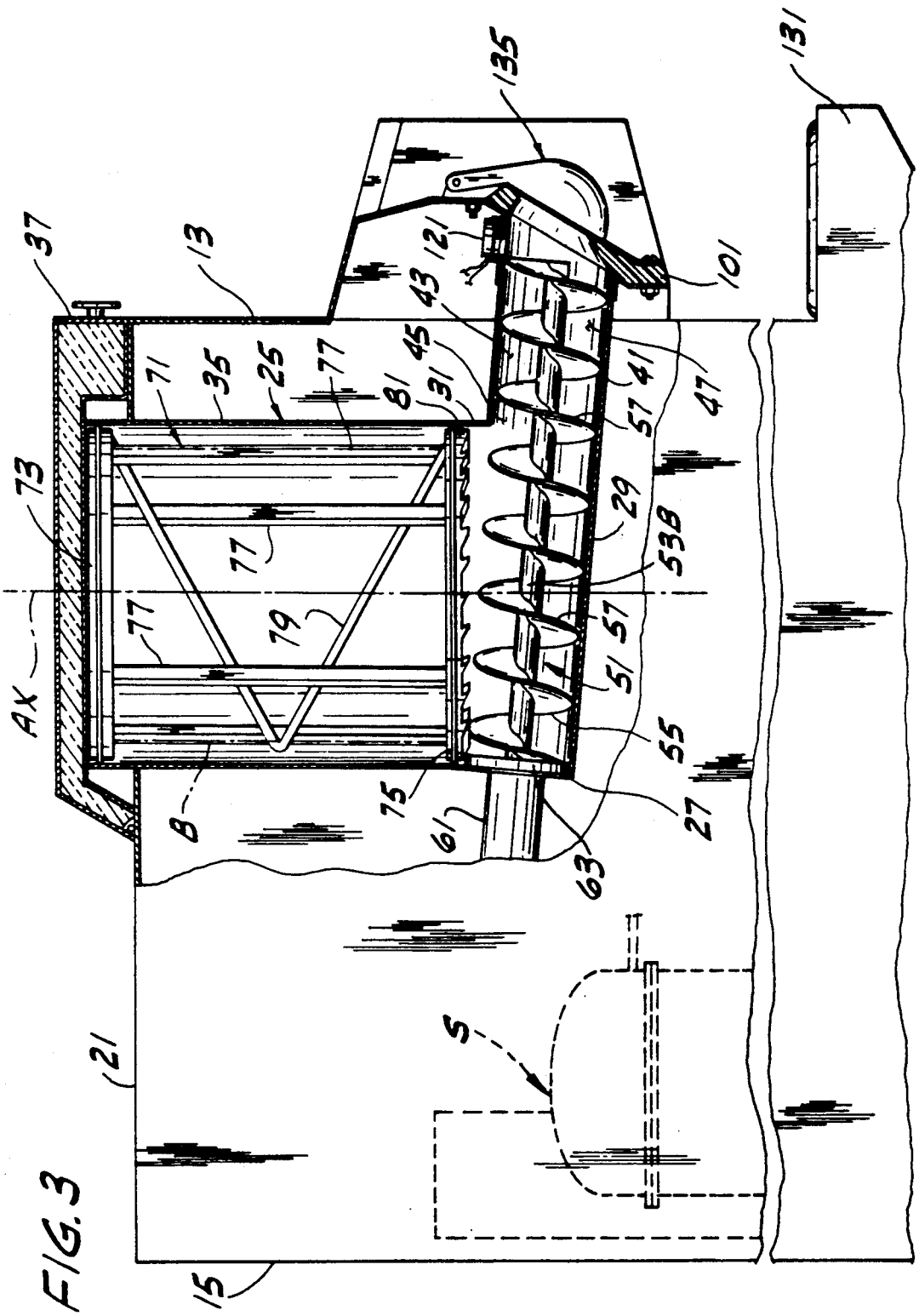

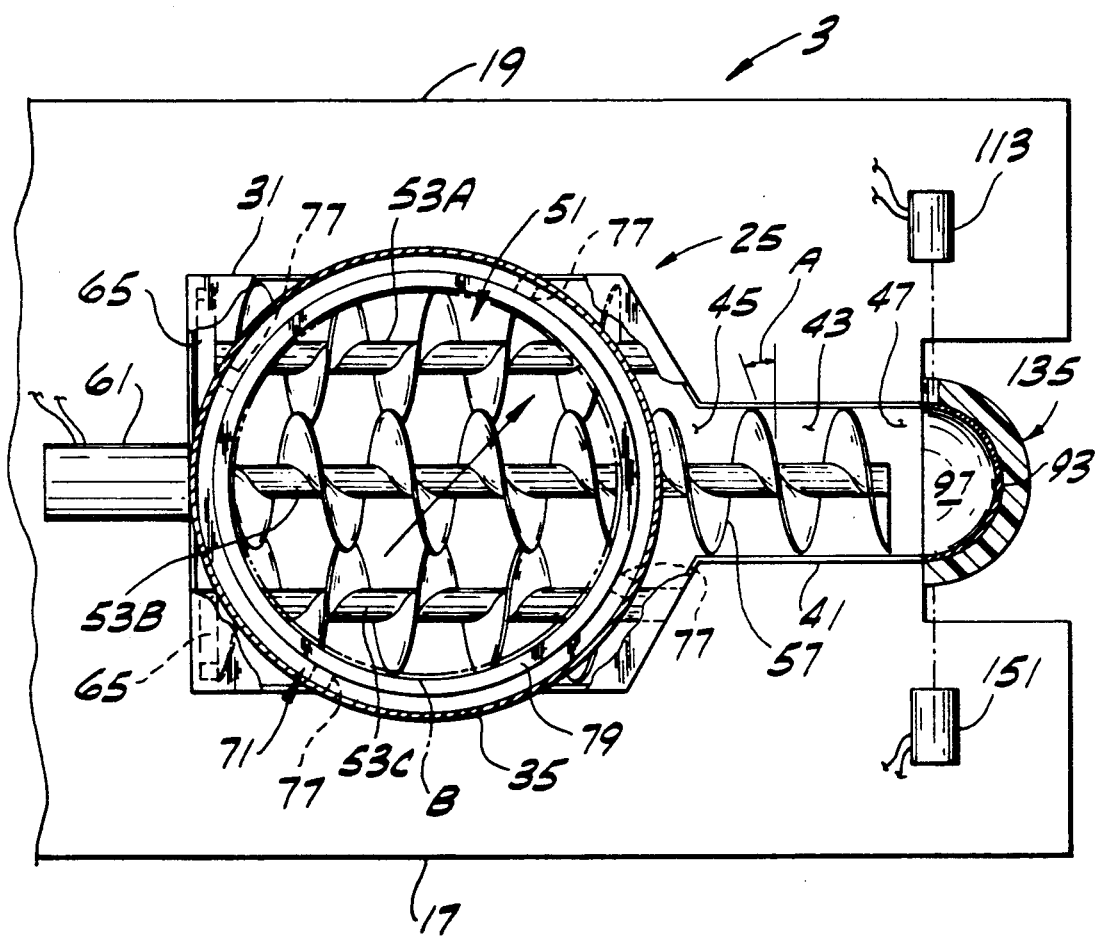

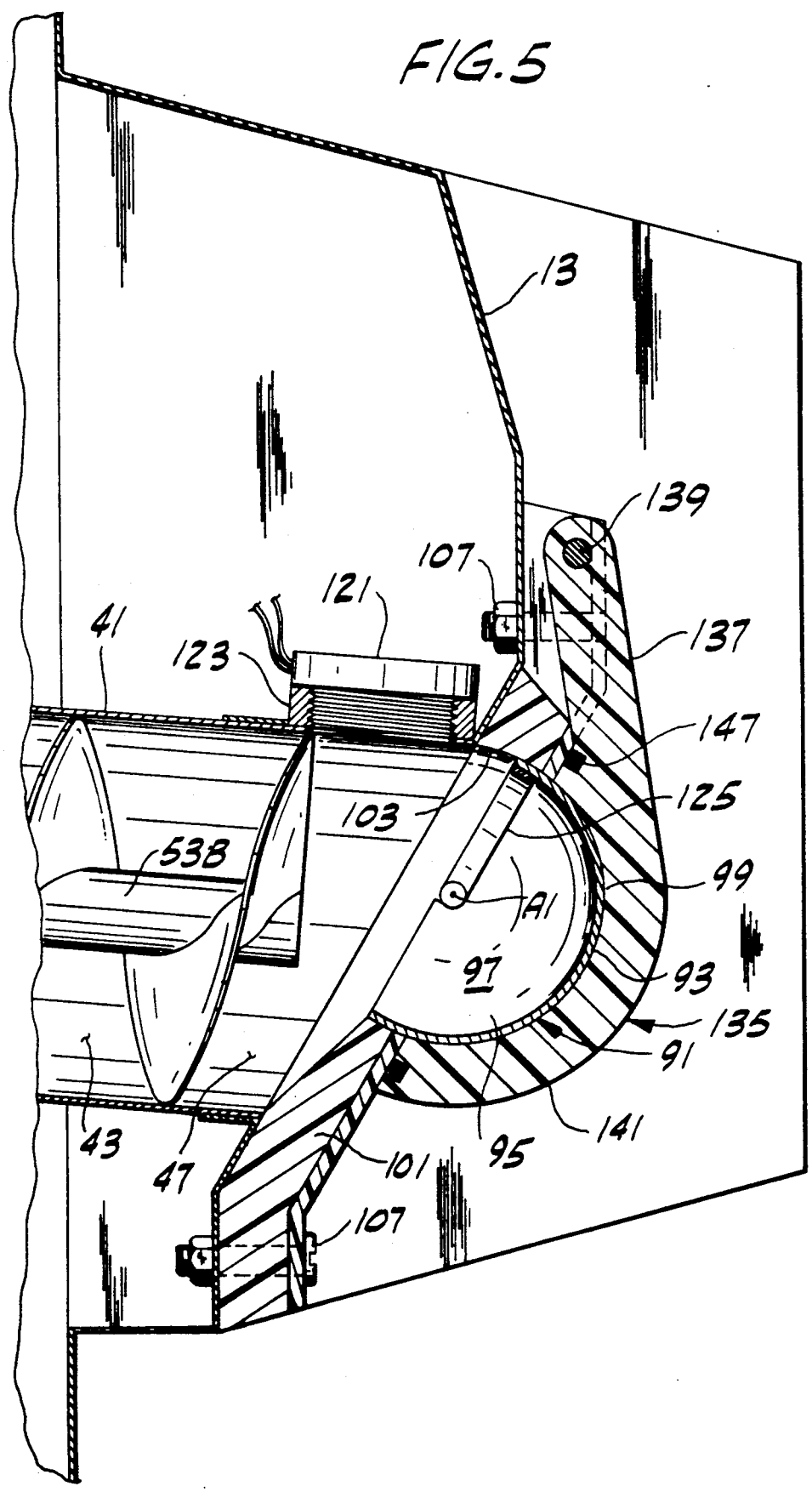

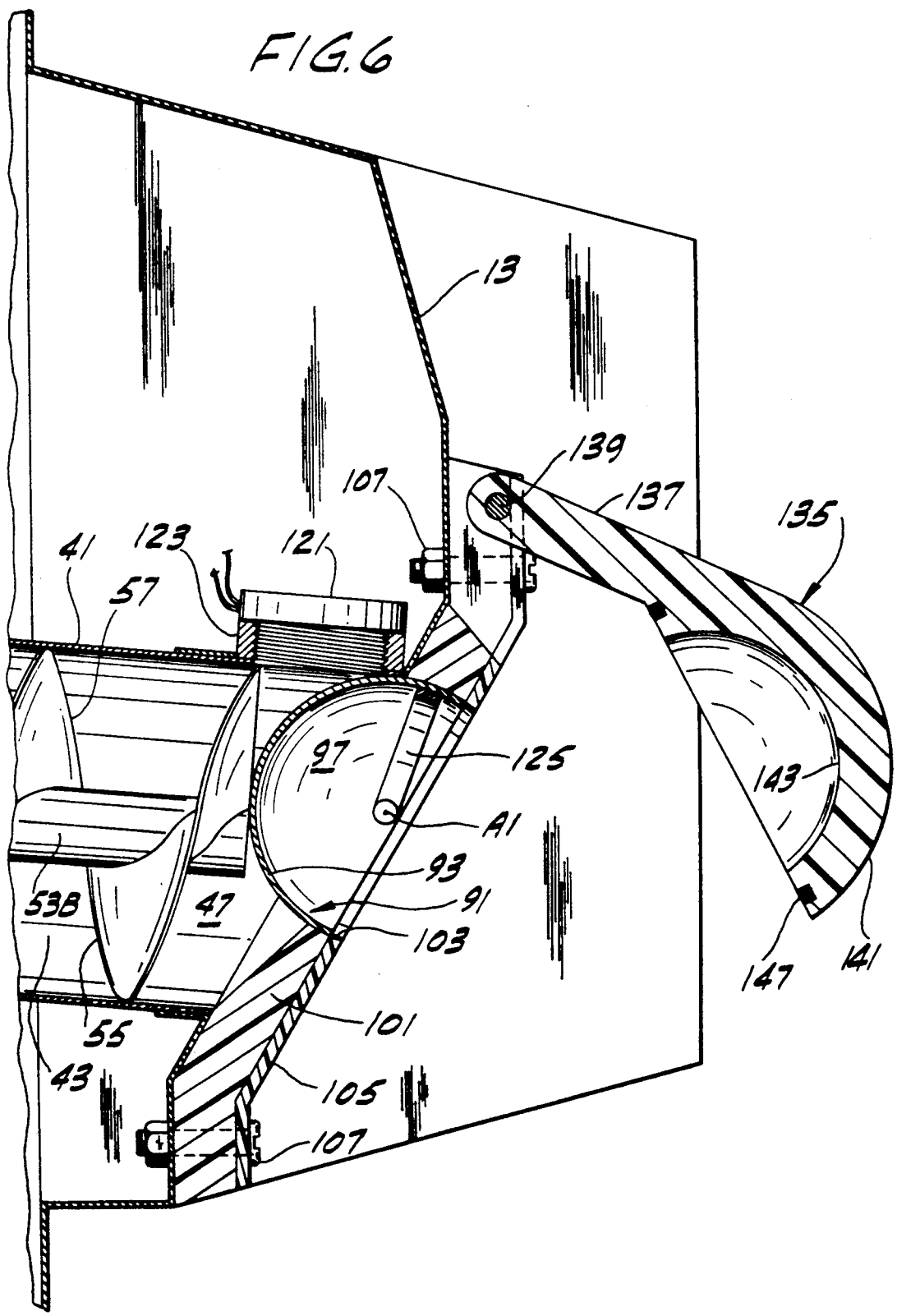

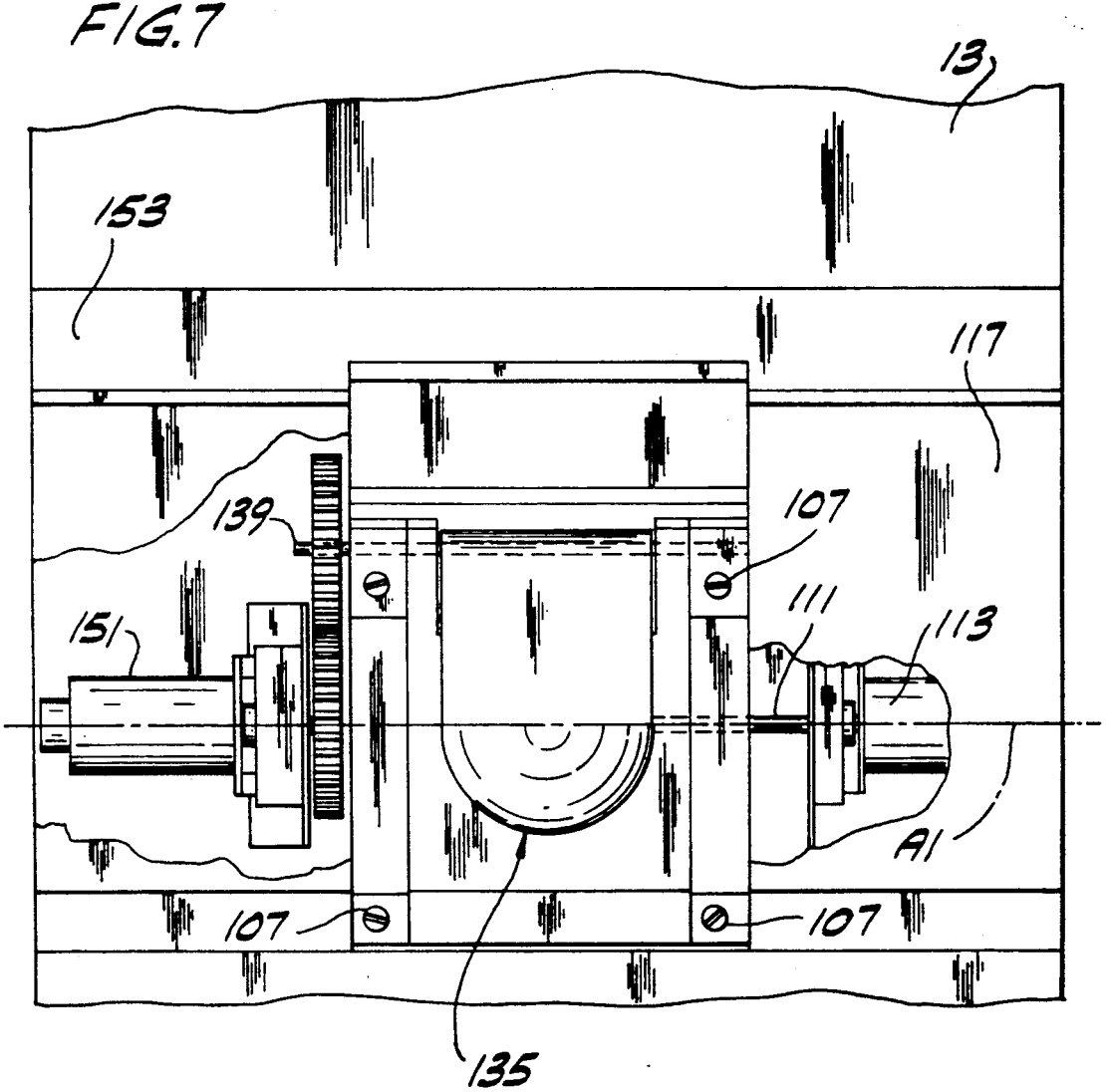

APPARATUS FOR AND METHOD OF DISPENSING FOOD PRODUCT SUCH AS HARD ICE CREAM

BACKGROUND OF THE INVENTION

This invention relates generally to apparatus for dispensing ice cream and, more particularly, to an automated dispenser for dispensing hard ice cream (as opposed to soft ice cream) and other food products.

Automated ice cream dispensers typically found in convenience and fast food stores, for example, are adapted for dispensing soft ice cream only. These dispensers are expensive to fabricate, difficult to clean and, most significantly, are unable to dispense hard ice cream which represents over 90% of the ice cream market and is the most popular snack food. To dispense hard ice cream in commercial quantities, it has heretofore been necessary to hand scoop ice cream from relatively large tubs of ice cream. Not only is this manual process relatively slow, difficult and labor-intensive, it is also very unsanitary. Moreover, the quantity of ice cream scooped on each occasion varies considerably. Many of these same problems also arise in dispensing other food products such as potato salad, cole slaw and baked beans.

Accordingly, there is a substantial and longfelt need in the industry for a machine which is capable of automatically dispensing hard ice cream and other food products.

SUMMARY OF THE INVENTION

Among the several objects of this invention may be noted the provision of apparatus for and a method of automatically dispensing hard ice cream and other food products; the provision of such apparatus and method which consistently dispenses uniform portions of food product, such as ice cream, of the proper density; the provision of such apparatus and method which operates at a relatively high dispensing speed; the provision of such apparatus which is easy to load and operate by a single person; the provision of such apparatus and method which virtually eliminates any waste of product; the provision of such apparatus which is adapted for maintaining the freshness of the food product being dispensed; the provision of such apparatus and method which requires no handling of the food product after initial loading of the apparatus, thereby ensuring sanitary operation; the provision of such apparatus which is quick and easy to maintain; the provision of such apparatus which is economical to manufacture; and the provision of such apparatus which is attractive in appearance and durable in use.

Generally, apparatus of this invention for automatically dispensing food product, such as hard ice cream, comprises means for holding a supply of food product under refrigeration, chamber means adjacent the container for receiving food product and for delivery therefrom of a serving portion of food product, and means in the container for removing food product from the supply for delivery to the chamber means thereby to pack the chamber means with food product.

The method of the present invention comprises placing a supply of hard food product in a container under refrigeration, removing food product from the supply and delivering the food product so removed to a chamber communicating with the interior of the container, continuing to deliver food product to the chamber until the chamber becomes packed to a predetermined extent and then stopping delivery, and dispensing a serving portion of packed food product in the chamber.

Other objects and features will be in part apparent and in part pointed out hereinafter.

DESCRIPTION OF THE DRAWINGS

FIG. 1 is a front elevation of dispensing apparatus of the present invention, including a dispensing unit and a refrigerated cabinet;

FIG. 2 is a top plan view of the dispensing unit;

FIG. 3 is a side elevation of FIG. 1 with parts broken away to show a refrigerated container of the dispensing unit;

FIG. 4 is a schematic top plan view of the refrigerated container;

FIG. 5 is a side elevational view of a scoop mechanism of the dispensing unit, showing a scoop member in a receiving position;

FIG. 6 is a view similar to FIG. 5 showing the scoop member in a dispensing position;

FIG. 7 is an enlarged portion of FIG. 1 showing the dispensing station of the dispensing unit, parts being broken away to show details;

Corresponding reference characters indicate corresponding parts throughout the several views of the drawings.

DESCRIPTION OF THE PREFERRED EMBODIMENT

Figure 8:
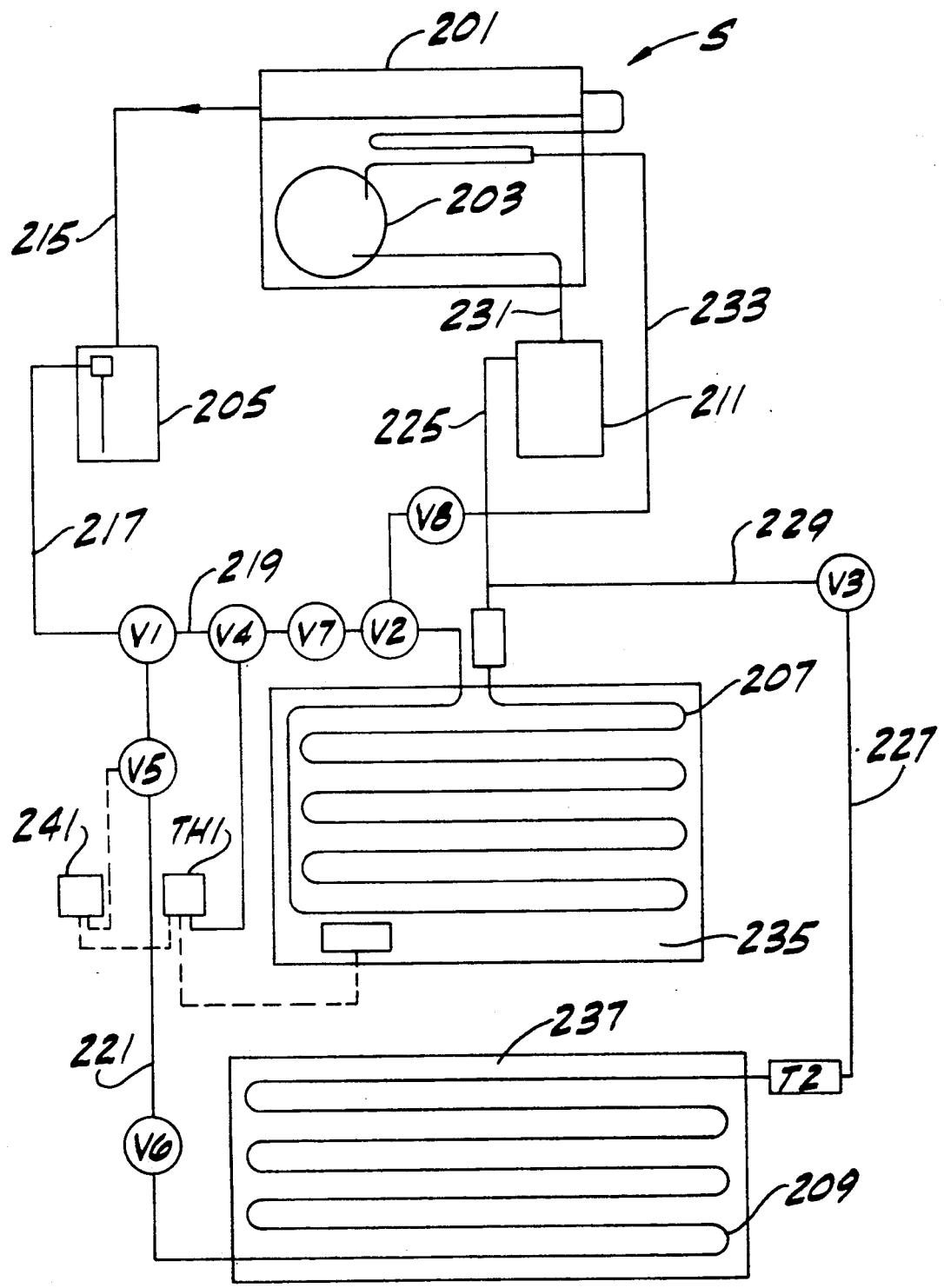
FIG. 8 is a view showing a refrigeration circuit for the dispensing unit and refrigerated cabinet.

Referring now to the drawings, and first more particularly to FIG. 1, apparatus of the present invention for automatically dispensing food product, such as hard ice cream, is indicated in its entirety by the reference numeral 1. As illustrated, the apparatus comprises a relatively compact dispensing unit, generally designated 3, which sits atop a refrigerated cabinet, generally designated 5, for storing a supply of food product (e.g., tubs of hard ice cream) used in the dispensing unit, as will be explained. While only one dispensing unit 3 is shown in the drawings, it will be understood that several units may be used side-by-side if desired (to supply different flavors of ice cream, for example). Similarly, the refrigerated cabinet 5 may be sized according to need. While the dispenser 3 of this invention is particularly suited for dispensing hard ice cream, it will be understood that it can be used to dispense other types of food product, such as potato salad, baked beans, cole slaw, etc.

More particularly, the dispensing unit 3 comprises a main housing, generally designated 11, of stainless steel or other suitable material having a front wall 13, a back wall 15, opposite side walls 17, 19 and a top wall 21. Disposed within the main housing is refrigerated container, generally designated 25, also preferably of stainless steel, located generally adjacent the front wall 13 of the housing. The container 25 has a central generally vertical axis AX (FIG. 3) and includes a lower portion 27 having a generally planar bottom 29 and a generally rectangular rim 31 extending up from the bottom, and an upper portion joined at its lower end to the rim 31 and forming a cylindric receptacle 35 sized to hold a supply of food product such as "hard" ice cream (as opposed to "soft-serve" type ice cream), the supply typically being in the shape of a cylindric block B of frozen food product. The receptacle 35 has an open bottom and an open top, the latter of which is closed by an insulated lid 37 hinged to the top wall 21 of the housing so that it may be swung open to provide access to the interior of the container. A tubular member 41 extending forwardly from the rim 31 defines a receiving chamber 43 of circular cross-section immediately adjacent the container and in communication therewith, the chamber 43 having an inlet 45 opening into the lower portion 27 of the container at a location immediately above the bottom 29 of the container and an outlet indicated at 47 at the front of the main housing 11. It will be observed that the bottom of the container and the bottom of the receiving chamber 43 slope downwardly toward the front of the main housing 11 so that any liquid (e.g., cleaning solution) in the container 25 will drain out the outlet 47 of the receiving chamber 43.

Indicated generally at 51 in the lower portion 27 of the container 25 is means for removing product from the food supply in receptacle 35 and for feeding the food product so removed to the receiving chamber 43 thereby to pack the chamber with food product. Means 51 comprises three generally parallel screw conveyors 53A, 53B, 53C (constituting screw conveyor means) extending in front to back direction across the interior of the lower portion 27 of the container 25 immediately above the bottom 29 thereof. Each screw conveyor has a helical cutting member 55 thereon portions of which constitute cutting blades 57 spaced at regular intervals along the conveyor for cutting pieces from the underside of the food supply B, which is adapted to rest atop the screw conveyors. The center screw conveyor 53B is rotated by means comprising an electric drive motor 61 and a suitable transmission including a drive gear 63 keyed on the shaft of the screw conveyor. The two screw conveyors 53A, 53C on opposite sides of the center screw conveyor 53B are driven by means of idler gears 65 in mesh with the center conveyor drive gear 63, the arrangement being such that all three screw conveyors are adapted to rotate in the same direction and at the same speed.

As best illustrated in FIGS. 3 and 4, the center screw conveyor 53B extends coaxially of the receiving chamber 43 substantially to the outlet end 47 thereof, the cutting blades 57 having a relatively close clearance fit with the wall of the receiving chamber. Screw conveyors 53A and 53C are shorter than the center screw conveyor, extending only the full front-to-back dimension of the lower portion 27 of the container 25. The screw conveyors are so sized and configured that their cutting blades 57 cover substantially the entire cross sectional area of the receptacle 35 for cutting pieces off block B uniformly across the entire underside of the block. The cutting blades of each screw conveyor are skewed at an angle A (e.g., 15 degrees) relative to the axis of the shaft. This angle will vary depending on the desired rate of feed to the receiving chamber 43 (the less the angle, the less the feed rate). The parallel screw conveyors 53A, 53B, 53C are spaced apart but sufficiently close together that the peripheral edge margins of the cutting blades 57 of each screw conveyor closely overlap the peripheral edge margins of an adjacent conveyor.

Rotation of the screw conveyors in the same direction on their respective axes imparts a movement to product cut from the food supply B to convey the product so removed along a path above and generally transverse to the screw conveyors in a direction generally indicated by the arrow in FIG. 4 (and in a plane generally transverse to the central vertical axis AX of the container), for impact against the rim 31 at the front of the container 25. At this location the rim is formed (angled) for directing the product to the inlet 45 of the receiving chamber 43. The center screw conveyor 53B conveys the product from the inlet of the receiving chamber to the outlet thereof. It will be understood, therefore, that the screw conveyors 53A, 53B, 53C not only constitute means for cutting product from the supply, but also means for delivering product so removed to the receiving chamber. The fact that the peripheral edge margins of the cutting blades of the screw conveyors overlap one another is beneficial in that any product adhered to the blades is scraped from the blades for delivery to the receiving chamber in the manner described above, thereby minimizing waste.

In accordance with another aspect of this invention, scraper means generally indicated at 71 is provided on the inside of the receptacle 35 between the side wall of the receptacle and the food supply B for preventing the latter from adhering to the wall of the receptacle. Specifically, means 71 comprises a cylindric skeleton framework including an annular top frame member 73, an annular bottom frame member 75, and a plurality of vertical supports 77 extending between the top and bottom frame members 73, 75 at regularly spaced intervals around the framework. The vertical supports are arranged in a circular configuration and are spaced from but relatively close to the side wall of the receptacle 35, so that there is sufficient room for a large block of food product to be positioned within the framework resting on the screw conveyors 53A, 53B, 53C therebelow. The framework supports a helical scraper member 79 which extends down in spiral fashion from the top frame member 73 to the bottom frame member 75 on the inside of the vertical supports 77. The scraper member, which may be formed from a suitable synthetic resin material, for example, is dimensioned for engagement with the sides of the frozen food product.

The annular bottom frame member 75 of the framework carries a ring gear 81 having teeth adapted to mesh with the teeth of a drive gear (not shown) rotated by motor 61. The arrangement is such that the motor 61, when energized to rotate the screw conveyors 53A, 53B, 53C, is also adapted to rotate the framework and the helical member 79 to prevent the frozen block B from sticking to the side wall of the receptacle. The helical configuration of the scraper member 79 is advantageous in that any frost or other material scraped from the block will be carried downwardly for delivery to the screw conveyors. As it turns, the helical member also functions to apply a downward force to the block to press it against the screw conveyors for efficient cutting and delivery of food product to the receiving chamber 43. The teeth of gear 81 and the gear driving it are preferably formed in such a way that rotation of the gears is adapted to exert a downward force on the scraper framework to hold the framework against upward movement in the receptacle 35.

Referring now to FIGS. 5 and 6, a scoop (constituting scoop means), generally indicated at 91, is located adjacent the outlet end of the receiving chamber. As shown in FIG. 5, the scoop comprises a scoop member 93 having a concave front or inner surface 95 defining a dispensing chamber 97, and a rounded back 99. The scoop member 93 is swingable on a generally horizontal axis A1 extending in side-to-side direction with respect to the main housing 11 from a receiving position (FIG. 5) wherein the dispensing chamber 97 of the scoop member 93 opens toward the outlet 47 of the receiving chamber 43 for receiving food product from the receiving chamber, to a dispensing position (FIG. 6) wherein the dispensing chamber 97 opens forwardly and downwardly at an appropriate dispensing angle (e.g., 30 degrees off vertical) away from the outlet 47 for dispensing a serving portion of food product held by the scoop member 93, and then back to its stated receiving position (FIG. 5). The space between the outlet of the receiving chamber and the scoop member is bridged by a support structure comprising a support plate 101 having an opening 103 in it conforming to the back surface 99 of the scoop member 93 for providing a sliding sealing fit between the scoop member and the plate 101 as it swings between its receiving and dispensing positions, and a face plate 105. Both the support plate 101 and the face plate 105 are attached by fasteners 107 to the front wall 13 of the main housing 11.

Means for moving the scoop member 93 between its receiving and dispensing positions comprises a horizontal shaft 111 connected to the scoop member and driven by a motor 113 and suitable transmission located in a housing 117 attached to the front wall 13 of the main housing 11 of the dispensing unit at one side of the scoop mechanism (the right side as viewed in FIGS. 1 and 7).

A pressure switch 121 is threaded into a fitting 123 secured to the tubular member 41 at the outlet end of the receiving chamber 43 immediately adjacent the dispensing chamber 97 formed by the scoop member 93. This switch 121 is operable for sensing the pressure at which food product is packed in the receiving and dispensing chambers 43, 97 (which may jointly be referred to as chamber means). It will be understood in this regard that as food product is delivered to the receiving and dispensing chambers, the chambers will become packed with food product. An important feature of the present invention is to control the extent or degree to which the food product becomes packed so that the density or compactness of the food product delivered by the scoop member 93 may be controlled. If ice cream, for example, is too loosely packed, the serving portion dispensed by the scoop member will be insufficient; if the ice cream is too tightly packed, the serving portion dispensed will be excessive (too dense). Moreover, the extent of packing is also important from the standpoint of taste, since ice cream which is too tightly packed (too dense) tends to lose its flavor. The function of the pressure switch 121 is to sense the pressure at which food product is packed in the receiving and dispensing chambers 43, 97 and to effect stoppage of delivery of food product to the receiving and dispensing chambers when the packing pressure (which is representative of the density or compactness of the packed food product) exceeds a predetermined pressure (e.g., for hard ice cream 0.25–10.0 p.s.i.; with the use of other foods the p.s.i. will vary). Such stoppage may be accomplished simply by deenergizing the motor 61 driving the screw conveyors 53A, 53B, 53C. It is contemplated that means other than a pressure switch may be suitable for achieving the intended function.

To facilitate the dispensing of food product from the scoop member 93, the machine includes a relatively narrow wiper blade 125 (constituting wiper means) curved to conform to the inside surface 95 of the scoop member 93. The wiper blade is pivoted on axis A1 by motor 113 and suitable gearing (not shown) to wipe or scrape the inside surface of the scoop member when the latter is in its dispensing position (FIG. 6) thereby to dispense a serving portion of food product held by the scoop member. A drip pan 131 projecting forwardly from the main housing 11 below the scoop member 93 is adapted to catch and drain any drippings from the scoop member.

Means comprising a cover for the scoop member is indicated generally at 135. The cover 135 comprises an upper arm portion 137 carried by a horizontal shaft 139 at the front of the main housing 11, and a lower cover portion 141 having a concave front surface 143 corresponding in shape to the rounded back 99 of the scoop member 93. The shaft 139 is rotatable in one direction to swing the cover from a closed position (see FIG. 5) wherein the lower portion 141 of the cover closely overlies the back 99 of the scoop member 93 when the latter is in its receiving position, to an open position (FIG. 6) in which the cover is swung up and away from the scoop member when the latter is in its dispensing position. The shaft 139 is rotatable in the opposite direction to swing the cover from its open position back to its closed position wherein an O-ring seal 147 carried by the lower cover portion 141 seals against the face plate 105 to insulate and protect the scoop member when the latter is in its receiving position. The shaft 139 is rotated by a motor 151 and suitable transmission located in a housing 153 attached to the main housing 11 of the dispensing unit on the left side of the scoop mechanism as viewed in FIG. 1.

FIG. 8 illustrates an exemplary refrigeration system S for the dispensing unit 3 and freezer cabinet 5, although it will be understood that other system configurations may also be suitable. As shown, the system S comprises a conditioning unit 201 housing a compressor 203, a receiver 205, a set of evaporator coils 207 for cooling the dispensing container 25, a set of evaporator coils 209 for cooling the freezer cabinet 5, and an accumulator 211. During a normal cooling cycle refrigerant flows from the compressor 203 to the receiver 205 via line 215, and from the receiver to a normally open divider valve V1 via line 217. The divider valve V1 directs the flow of refrigerant into two lines 219 and 221, the former of which supplies refrigerant through a normally open valve V2 to evaporator coil 207 for the freezer cabinet 5, and the latter of which supplies refrigerant to evaporator coil 209 which cools the container 25 of the dispensing unit. Flow from the evaporator coil 207 for the freezer cabinet 5 is through line 225 to the accumulator 211. Flow from the evaporator coil 209 is through line 227 to a valve V3 and thence through line 229 to a juncture with line 225 for flow to the accumulator 211. Refrigerant flows from the accumulator to the suction side of the compressor 203 via line 231. A defrost line 233 connects the discharge side of the compressor and valve V2, the latter of which blocks flow through the defrost line during normal cooling operation.

Flow of refrigerant through the system is further controlled by valves V4–V7, temperature sensors T1 (for sensing the temperature of an evaporator plate 235 in the freezer cabinet 5), T2 (for sensing the temperature of an evaporator plate 237 on the container 25) and T3

(for sensing the temperature of the return line 225), thermostat TH1 and an on/off switch 241. When the on/off switch 241 is on, the thermostat TH1 is responsive to the temperature of the evaporator plate 235 in the freezer cabinet 5 as sensed by temperature sensor T1 to turn on the compressor 203 if the temperature is too low and to shut off the compressor if the temperature is too high. Valve V4, which may be a solenoid valve, is responsive to temperature sensor T1, the arrangement being such that the valve is adapted to partially close to reduce the flow of refrigerant to the freezer cabinet in the event the temperature of the cabinet falls below a preset temperature, and to open to a greater extent to increase the flow of refrigerant in the event the temperature exceeds the preset temperature. Turning the on/-off switch 241 on also opens valve V5 (which may be a solenoid valve) to permit flow of refrigerant to evaporator coil 209. Valve V6 in line 221 is responsive to temperature sensor T2, the arrangement being such that the valve is adapted to partially close if the temperature of return line 227 falls below a preset temperature to reduce the flow of refrigerant to the evaporator coils 209, and to open to a greater extent if the temperature exceeds the preset temperature to increase the flow of refrigerant to the coils. Valve V7 in line is responsive to temperature sensor T3, the arrangement being such that the valve is adapted to partially close if the temperature of return line 225 falls below a preset temperature to reduce the flow of refrigerant to the evaporator coils 207, and to open to a greater extent if the temperature of the return line 225 exceeds the preset temperature to increase the flow of refrigerant to the coils. Valve V3 is a pressure regulating valve; it remains open so long as the system pressure remains above a predetermined pressure but is adapted to close if the pressure drops below the predetermined pressure (e.g., when the compressor 203 is off).

During a defrost cycle, valve V8 is adapted to open and valve V1 is adapted to close to permit reverse flow through the evaporator coils to defrost the system.

As shown in FIG. 3, various components of the refrigeration system (e.g., the compressor 203, receiver 205, accumulator 211, etc.) may be housed in the main housing 11 of the dispensing unit 3 to the rear of the container 25.

To operate the dispensing unit 3 of this invention, a supply B of food product such as frozen "hard" ice cream is placed in the receptacle 35 of the refrigerated container 25 in a position where the ice cream bears on the cutting blades 57 of the screw conveyors 53A, 53B, 53C and is surrounded by the helical scraper member 79. The drive motor 61 is then energized by suitable means (e.g., a push button P1 at the front of the main housing 11) to rotate the screw conveyors and the scraper mechanism. As the screw conveyors rotate, their cutting blades 57 remove portions of ice cream from the underside of the block B and impart a movement to the ice cream so removed causing it to move along a path generally transverse to the screw conveyors until they contact the rim 31 of the container 25, at which point the ice cream is adapted to be directed by the rim to the inlet 45 of the receiving chamber 43. From there, the center screw conveyor 53B conveys the ice cream through the receiving chamber and into the dispensing chamber 97 defined by scoop member 93 in its receiving position to fill the scoop member with a serving portion. The screw conveyors 53A, 53B, 53C continue to rotate until the receiving and dispensing chambers 43, 97 are suitably packed (i.e., packed to a predetermined density) as sensed by the pressure switch 121 at the outlet end 47 of the receiving chamber 43, whereupon the pressure switch is adapted to generate a signal to deenergize the drive motor 61 and thus stop rotation of the screw conveyors to halt further delivery of ice cream to the receiving and dispensing chambers.

When the pressure switch 121 signals the drive motor 61 to stop, the scoop cover motor 151 is automatically energized to cause the scoop cover 135 to swing up to its open position, and the scoop motor 113 is automatically energized to cause the scoop member 93 to rotate from its receiving position to its dispensing position. A suitable control (e.g., a push button P2 at the front of the main housing 11) is then actuated to cause the wiper blade 125 to wipe the scoop member, thereby causing a serving portion of ice cream to be discharged into a waiting receptacle, such as a cup or cone. After a suitably short delay (e.g., a 3-second delay), the scoop and cover motors 113, 151 are adapted to cause the scoop member 93 to return to its receiving position and the cover 135 to swing down to its closed position covering the back of the scoop member to insulate it and to maintain it clean.

The above cycle is repeated as needed, it being understood that after an initial cycle is completed in which the receiving chamber is filled with ice cream, subsequent cycles will be relatively short, since the screw conveyors 53A, 53B, 53C will only need to rotate a short time before the dispensing chamber 97 is suitably filled and the pressure sensor 121 signals stoppage of the screw conveyors.

Figure 9:
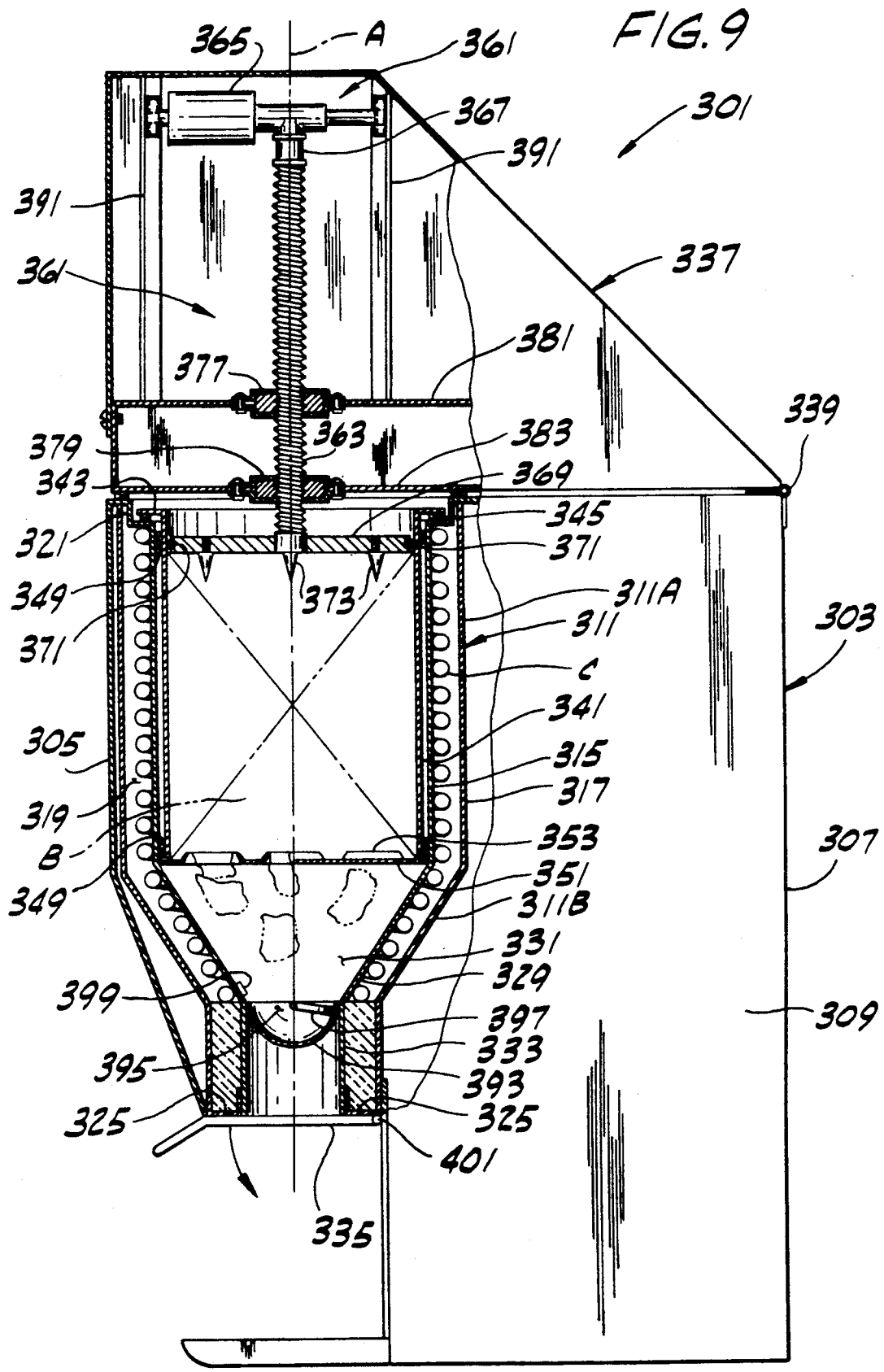
FIG. 9 is an elevational view of an alternative embodiment of the dispenser, parts being broken away to illustrate details.

Referring to FIG. 9, an alternative embodiment of the dispenser of the present invention is generally designated 301. This dispenser comprises a main housing, generally designated 303, having a front wall 305, a back wall 307, and opposite side walls 309 (only one of which is shown). Disposed within the housing is a refrigerated container, generally designated 311, located generally adjacent the front wall 305 of the housing. The container is of double-wall construction, having inner and outer walls designated 315 and 317, respectively, defining an annular space 319 therebetween to accommodate suitable insulation (not shown) and the cooling coils C of a cooling system similar to system S previously described. The container is supported at its upper end by an annular ring 321 generally Z-shaped in cross section affixed to the main housing 303 and at its lower end by suitable support members 325 affixed to the main housing. As illustrated, the container 311 has a cylindric upper portion 311A and a funnel-shaped lower portion 311B the latter having an upper conical section 329 defining a receiving chamber 331 and a lower cylindric section 333. The container 311 has an open bottom closed by a door 335 and an open top closed by a lid generally designated 337 hinged at 339 to the main housing 303 so that it may be swung open to provide access to the interior of the container.

A tubular open-ended receptacle 341 is positioned within the upper portion of the container 311A for holding a supply B of ice cream or other food product. The receptacle 341 is formed with a peripheral flange 343 at its upper end which projects radially outwardly over the ring 321. For reasons which will appear, the receptacle 341 is rotatable in the container on the central vertical axis A of the container, suitable bearings 345 being provided for this purpose between flange 343 and ring 321 and other bearings 349 being provided between the receptacle 341 and the inner wall 315 of the container 311. Cutting means in the form of a flat relatively thin metal disc 351 is mounted in fixed stationary position adjacent the bottom of the upper portion 311A of the container immediately below the receptacle 341. The disc is formed with cutting blades 353 which are engageable with the underside of the supply B of ice cream in the receptacle. The cutting blades are formed for feeding ice cream cut from the supply B down through openings in the disc 351 and thence into the receiving chamber 331 therebelow.

Indicated generally at 361 is means for effecting relative rotation between the cutter disc 351 and the ice cream B in receptacle 341 thereby to cut ice cream from the supply for delivery to the receiving chamber 331. Specifically, means 361 comprises a screw shaft 363 rotatable on the central axis A of the container by means of a motor 365 and suitable coupling 367, a circular plate 369 rigidly affixed to the lower end of the screw shaft in a position within the receptacle 341 overlying the ice cream, and driving connections 371 between the plate and the receptacle whereby the two members rotate as a unit. A plurality of spikes 373 or other suitable anti-slip members project down from the underside of the plate 369 for embedment in the ice cream to prevent relative rotation between the plate and the ice cream as the plate rotates. It will be understood, therefore, that the plate 369, receptacle 341 and ice cream are conjointly rotatable relative to the stationary cutter disc 351.

As illustrated, the screw shaft 363 is threaded through a pair of vertically spaced nuts 377, 379 mounted in fixed position on horizontal supports 381, 383 in the lid 337. Thus, when the shaft rotates, the plate 369 is adapted to move vertically in the receptacle 341, the driving connections 371 (e.g., keys in vertical keyways) permitting such movement. The motor 365 is mounted on tracks 391 so it too may move vertically as the shaft rotates. The motor is reversible to rotate the screw shaft in one direction to cause the circular plate 369 to move downwardly in the receptacle thereby to force the supply B of ice cream (or other food product) against the cutting blades 353 on the cutter disc 351, and in the opposite direction to cause the plate 369 to move upwardly.

A scoop 393 similar to scoop 91 described in the first embodiment of this invention is mounted in the lower portion of the container 311B immediately below the conical section 329 defining the receiving chamber 331 of the dispenser. The interior of this scoop 91 defines a dispensing chamber 395, as described earlier in connection with dispenser 1. The scoop 393 is rotatable between a receiving position (FIG. 9) wherein the dispensing chamber 395 faces upwardly toward the receiving chamber 331 for receiving a serving portion of ice cream, and a dispensing position wherein the dispensing chamber faces downwardly to dispense the ice cream therein. A mechanism similar to that described in connection with dispenser 1 may be used to move the scoop 393 between its receiving and dispensing positions. The scoop also has a wiper blade 397 therein similar in construction and operation to that previously described.

Means in the form of a pressure sensor 399 is provided on the conical wall of the receiving chamber 331 immediately adjacent the dispensing chamber 395 of the scoop 393 for sensing the extent to which the ice cream (or other food product) is compacted. As stated with respect to the first embodiment, it will be understood that other means may be used for sensing such compactness. When the ice cream becomes suitably packed or compacted as sensed by the pressure sensor 399, a signal is sent to deenergize the motor 365 to stop further rotation of the receptacle 341 and ice cream therein relative to the cutter disc 351, thereby halting further delivery of ice cream to the receiving chamber.

Unlike the dispenser 1 of the first embodiment, scoop 393 has no cover. Instead door 335 serves to maintain proper refrigeration and cleanliness. The door is swingable on a hinge 401 by suitable means (similar to the mechanism for cover 135 in the first embodiment) between a closed position and an open position for allowing a portion of ice cream to be dispensed into a suitable receptacle below the outlet of the container 311.

In operation, the dispenser 301 is similar to the operation of dispenser 1. To initiate a dispensing cycle, the motor 365 is energized to rotate the screw shaft 363, thereby causing the circular plate 369, receptacle 341 and ice cream to rotate as a unit and the circular plate to move downwardly at a relatively slow rate in the receptacle to push the ice cream against the cutter disc 351. Ice cream (or other food product) cut from the underside of the supply B is fed into the receiving chamber 331 and into the scoop 393 (which is in its receiving position) until the dispensing chamber 395 is suitably packed with ice cream (i.e., until the ice cream to be dispensed is of predetermined compactness) as sensed by the pressure switch 399, whereupon the pressure switch is adapted to generate a signal to deenergize the motor 365 and thus stop rotation of the screw shaft 363 to halt further delivery of ice cream to the receiving and dispensing chambers.

When the pressure switch signals the drive motor 365 to stop, the motor (not shown) controlling operation of the door 335 is automatically energized to cause the door 335 to swing down to its open position, and the scoop motor (not shown) is automatically energized to cause the scoop 393 to rotate from its receiving position to its dispensing position. A suitable control (e.g., a pushbutton at the front of the main housing 303) is then actuated to cause the wiper blade 397 to wipe the scoop, thereby causing a serving portion of ice cream to be discharged into a waiting receptacle, such as a cup or cone. After a suitably short delay (e.g., a 3-second delay), the scoop and door motors are adapted to cause the scoop 393 to return to its receiving position and the door 335 to swing up to its closed position covering the outlet of the container to maintain proper refrigeration and cleanliness.

The above cycle is repeated as needed, it being understood that after an initial cycle is completed in which the receiving chamber 331 is filled with ice cream, subsequent cycles will be relatively short, since the screw shaft 363 will only need to rotate a short time before the dispensing chamber 395 is suitably filled and the pressure sensor 399 signals stoppage of the screw shaft. When the plate 369 has descended to a predetermined position (as detected by suitable means), the motor 365 is adapted to reverse to raise the plate up to a position above the top of the receptacle 341, thereby enabling the lid 337 to be opened so that a new supply of ice cream can be placed into the receptacle 341.

It is contemplated that relative rotation between the cutter disc and ice cream may be effected in ways other than that illustrated in dispenser 301. For example, conjoint rotation of the plate 369, receptacle 341 and food supply B can be accomplished by a driving connection between ring gearing on the receptacle and a suitable gear motor. In this embodiment, there is no need for a screw shaft and associated parts. The weight of plate 369 serves to exert a downward force on the ice cream in the receptacle.

Figure 10:
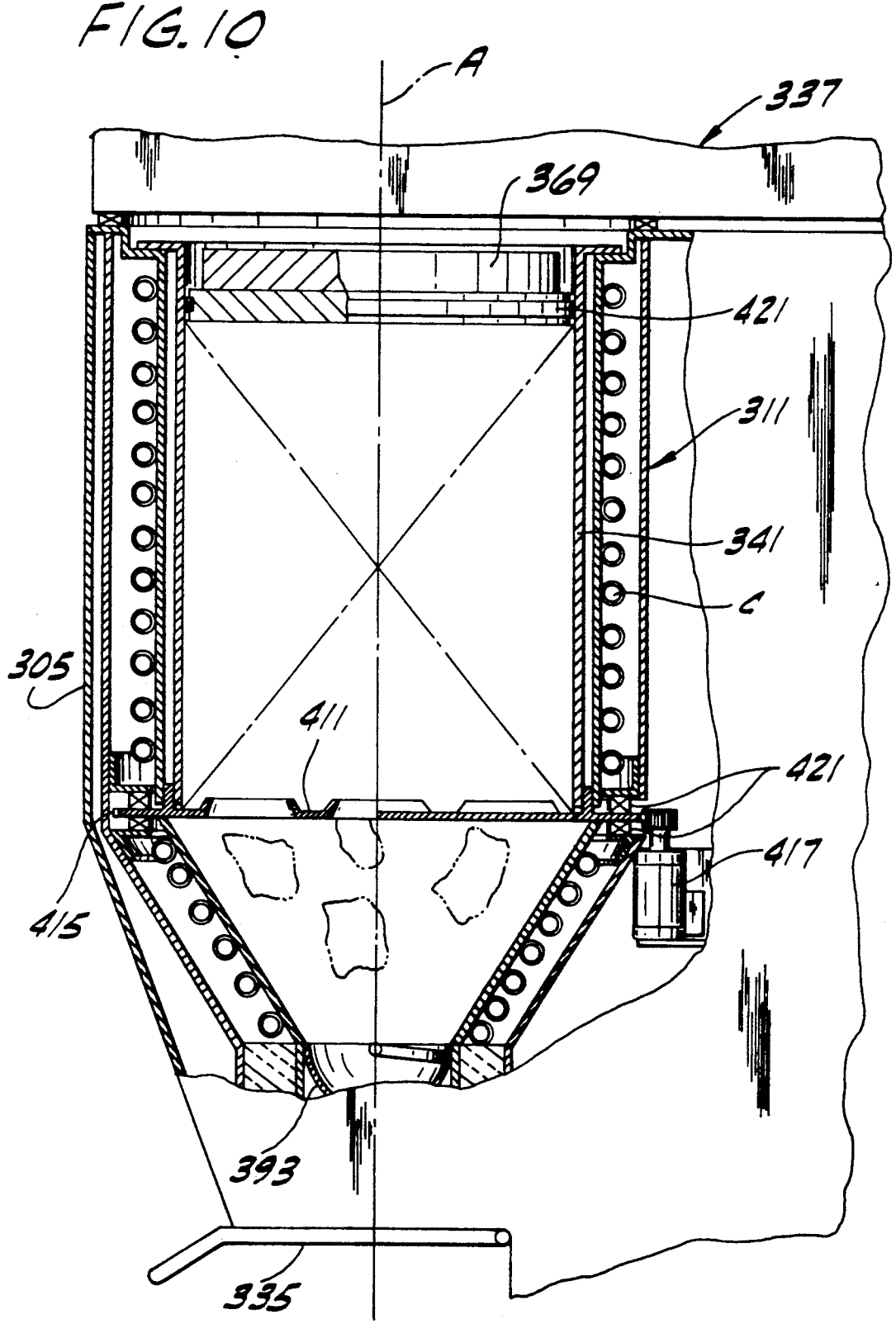
FIG. 10 is a view similar to FIG. 9 showing a further embodiment of the dispenser.

FIG. 10 illustrates a modification of the design shown if FIG. 9, corresponding parts being indicated by corresponding reference numerals. In the FIG. 10 design, the cutter disc 411 is rotated while the plate 369, receptacle 341 and food supply B remain stationary. In this latter design, the cutter disc 411 is mounted in the container 311 for rotation on central axis A. The periphery of the disc 411 is formed with gearing 415 engageable by a gear motor 417 to rotate the disc. Pinch ring seals 421 engageable with the top and bottom faces of the disc 411 immediately inward of the peripheral gearing 415 ensure that food product in the receptacle does not contact the gearing 415. The plate 369 has an O-ring seal 421 thereon engageable with the side wall of the receptacle.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

I claim:

1. Apparatus for automatically dispensing food product such as hard ice cream, comprising:
    means for holding a supply of food product under refrigeration,
    chamber means adjacent said holding means for receiving food product an for delivery therefrom of a serving portion of food product,
    cutting means for cutting food product from the supply for delivery to said chamber means thereby to pack said chamber means with food product, and
    means for sensing the extent to which food product is packed in said chamber means and for effecting stoppage of delivery of food product to said chamber means when said chamber means becomes packed to a predetermined extent.

2. Apparatus as set forth in claim 1 wherein said means for sensing comprises a pressure sensor for sensing the pressure at which food product is packed in said chamber means, said pressure sensor being responsive to said packing pressure reaching or exceeding a predetermined pressure for effecting stoppage of delivery of food product to said chamber means.

3. Apparatus as set forth in claim 1 wherein said predetermined pressure is about 0.1-2.0 psi.

4. Apparatus as set forth in claim 1 wherein said holding means comprises a refrigerated container having a lower portion adapted to contain said cutting means and an upper portion adapted to contain said supply of food product.

5. Apparatus as set forth in claim 4 wherein said chamber means has an inlet communicating with said lower portion of said holding means.

6. Apparatus as set forth in claim 1 wherein said cutting means is also operable to feed food product removed from the supply to said chamber means.

7. Apparatus as set forth in claim 6 wherein said cutting means comprises a cutter for cutting pieces of food product from said supply and for delivering said pieces to said chamber means.

8. Apparatus as set forth in claim 7 wherein said holding means comprises a refrigerated container having a lower portion adapted to contain said cutter and an upper portion adapted to contain said supply of food product.

9. Apparatus as set forth in claim 8 wherein said refrigerated container has a central generally vertical axis and said cutter comprises screw conveyor means in said lower portion of said container, said supply of food product being adapted to rest on said screw conveyor means, and drive means for rotating said screw conveyor means for cutting food product from the underside of the supply and delivering it to said chamber means along a path generally transverse to the central axis of the container.

10. Apparatus as set forth in claim 9 wherein said screw conveyor means comprises a plurality of generally parallel screw conveyors at least one of which extends into said chamber means, each screw conveyor having a plurality of cutting blades thereon spaced at intervals lengthwise of the screw conveyor.

11. Apparatus as set forth in claim 10 wherein each screw conveyor has a helical cutting member thereon portions of which constitute said cutting blades, the cutting blades of each shaft having peripheral edge margins overlapping the peripheral edge margins of the cutting blades of an adjacent screw conveyor thereby to scrape food product from the blades.

12. Apparatus as set forth in claim 10 wherein said drive means is operable for rotating said screw conveyors in the same direction on their respective axes thereby to impart a movement to food product cut from said supply conveying it along a path atop and generally transverse to the screw conveyors for delivery to said chamber means.

13. Apparatus as set forth in claim 1 wherein said holding means comprises a refrigerated container having a generally central vertical axis, said chamber means comprising a receiving chamber extending generally laterally from the interior of said refrigerated container with an inlet communicating with the interior of the container and an outlet, and a dispensing chamber adjacent the outlet of the receiving chamber for holding a serving portion of food product to be dispensed.

14. Apparatus as set forth in claim 12 wherein said means for sensing is generally adjacent said dispensing chamber.

15. Apparatus as set forth in claim 14 wherein said means for sensing comprises a pressure sensor for sensing the pressure at which food product is packed in said chamber means, said pressure sensor being responsive to said packing pressure reaching or exceeding a predetermined pressure for effecting stoppage of delivery of food product to said chamber means.

16. Apparatus as set forth in claim 13 further comprising means for dispensing a serving portion of food product packed in said dispensing chamber.

17. Apparatus as set forth in claim 16 wherein said means for dispensing comprises scoop means having a concave inner surface defining said dispensing chamber, and means for moving the scoop means from a receiving position wherein said dispensing chamber opens toward said outlet for receiving food product from the receiving chamber, to a dispensing position wherein the dispensing chamber of the scoop means opens away from the outlet for dispensing a serving portion of food product held by the scoop means, and then back to said receiving position.

18. Apparatus as set forth in claim 17 wherein said means for sensing is generally adjacent said dispensing chamber.

19. Apparatus as set forth in claim 18 wherein said means for sensing comprises a pressure sensor for sensing the pressure at which food product is packed in said chamber means, said pressure sensor being responsive to said packing pressure reaching or exceeding a predetermined pressure for effecting stoppage of delivery of food product to said chamber means.

20. Apparatus as set forth in claim 17 wherein said means for moving said scoop means is operable to move the scoop means from its said receiving position toward its said dispensing position in response to the packing pressure, as sensed by said pressure sensing means, reaching or exceeding said predetermined magnitude.

21. Apparatus as set forth in claim 17 wherein said scoop means substantially closes the outlet of the receiving chamber when the scoop is in its receiving position.

22. Apparatus as set forth in claim 17, said apparatus further comprising cover means for the scoop means movable between a closed position wherein the cover means covers the scoop means when the scoop means is in its said receiving position and an open position wherein the cover means is removed from the scoop means when the scoop means is in its said dispensing position.

23. Apparatus as set forth in claim 17 further comprising wiper means for wiping the front surface of the said scoop means when the scoop means is in its dispensing position thereby to dispense a serving portion of food product from said scoop means.

24. Apparatus as set forth in claim 4 said apparatus further comprising scraper means movable on the inside of the upper portion of said container in an annular space between said supply of food product and a wall of the container for preventing said supply of food product from adhering to the wall of the container.

25. Apparatus as set forth in claim 24 wherein said scraper means comprises a helical scraper member generally coaxial with said container and engageable with said supply of food product, and means for rotating said helical scraper member about a central axis of the container.

26. Apparatus as set forth in claim 4 further comprising means for applying a downward force to said supply of food product in the upper portion of the container.

27. Apparatus as set forth in claim 26 wherein said means for applying a downward force comprises a helical member generally coaxial with the container and engageable with said supply of food product, and means for rotating said helical member about a central axis of the container, the engagement between the helical member and the supply of food product as the helical member rotates being adapted to apply said downward force to the supply.

28. Apparatus as set forth in claim 1 further comprising means for refrigerating said holding means, and a refrigerated cabinet adjacent said container for storing an additional supply of food product, said means for refrigerating said holding means being operable also to refrigerate said cabinet means.

29. Apparatus as set forth in claim 1 wherein said holding means comprises refrigerated container means and a tubular receptacle in said container means for holding said supply of food product.

30. Apparatus as set forth in claim 29 wherein said cutting means comprises a cutter in said container means adjacent one end of said tubular receptacle, and means for effecting relative rotation between the cutter and said receptacle whereby the cutter is adapted to cut food product from the supply for delivery to said chamber means.

31. Apparatus as set forth in claim 30 wherein said means for effecting relative rotation comprises drive means for rotating said receptacle relative to said cutter.

32. Apparatus as set forth in claim 31 further comprising means for preventing relative rotation between said receptacle and said supply of food product therein.

33. Apparatus as set forth in claim 31 further comprising means movable in said receptacle for forcing said supply of food product against said cutter.

34. Apparatus as set forth in claim 30 wherein said means for effecting relative rotation comprises drive means for rotating said cutter relative to the receptacle.

35. Apparatus as set forth in claim 34 further comprising means movable in said receptacle for forcing said supply of food product against said cutter.

36. Apparatus as set forth in claim 30 wherein said refrigerated container means defines said chamber means.

37. Apparatus as set forth in claim 36 wherein said means for sensing comprises a pressure sensor for sensing the pressure at which food product is packed in said chamber means, said pressure sensor being responsive to said packing pressure reaching or exceeding a predetermined pressure for effecting stoppage of delivery of food product to said chamber means.

38. Apparatus as set forth in claim 30 wherein said chamber means comprises a receiving chamber disposed adjacent said cutter for receiving food product as it is cut from said supply of food product, and a dispensing chamber adjacent the receiving chamber for holding a serving portion of food product to be dispensed.

39. Apparatus as set forth in claim 38 further comprising means for dispensing a serving portion of food product packed in said dispensing chamber.

40. Apparatus as set forth in claim 39 wherein said means for dispensing comprises scoop means having a concave inner surface defining said dispensing chamber, and means for moving the scoop means from a receiving position wherein said dispensing chamber opens toward said receiving chamber for receiving food product from the receiving chamber, to a dispensing position wherein the dispensing chamber of the scoop means opens away from said receiving chamber for dispensing a serving portion of food product held by the scoop means, and then back to said receiving position.

41. Apparatus as set forth in claim 40 wherein said means for sensing comprises a pressure sensor for sensing the pressure at which food product is packed in said chamber means, said pressure sensor being responsive to said packing pressure reaching or exceeding a predetermined pressure for effecting stoppage of delivery of food product to said chamber means.

42. Apparatus as set forth in claim 41 wherein said means for moving said scoop means is operable to move the scoop means from its said receiving position toward its said dispensing position in response to the packing pressure, as sensed by said pressure sensing means, reaching or exceeding said predetermined magnitude.

43. Apparatus as set forth in claim 40 further comprising wiper means for wiping the front surface of the said scoop means when the scoop means is in its dispensing position thereby to dispense a serving portion of food product from said scoop means.

44. A method of automatically dispensing food product such as hard ice cream, comprising placing a supply of hard food product in a container under refrigeration, cutting food product from the supply and delivering food product so removed to chamber means communicating with the interior of the container, continuing to deliver food product to said chamber means until the chamber means becomes packed to a predetermined extent and then stopping deliver, sensing the pressure at which food product is packed in said chamber means and stopping delivery of food product to said chamber means when the packing pressure reaches or exceeds a predetermined pressure, and dispensing a serving portion of food product packed in said chamber means.

45. A method as set forth in claim 44 wherein said container has a generally central vertical axis and said chamber means comprises a receiving chamber communicating with the interior of the container and extending generally laterally therefrom, and a dispensing chamber defined by scoop means adjacent the receiving chamber, said method further comprising activating said scoop means when said chamber means has been packed to said predetermine extent to move from a receiving position wherein the scoop means is positioned for receiving food product from the receiving chamber to a dispensing position for dispensing food product from the scoop means.

46. A method as set forth in claim 45 further comprising the step of wiping food product from said scoop means when the latter is in said dispensing position.

47. A method as set forth in claim 44 further comprising moving a scraping element between said supply of food product and a side wall of the container for preventing said supply from adhering to the side wall.

48. A method as set forth in claim 47 wherein said scraping element comprises a helical scraper member having a central axis generally coincident with a central axis of the container, said method further comprising rotating said helical scraper member on said axis.

49. A method as set forth in claim 44 wherein said container has a central generally vertical axis, said cutting and delivering step comprising cutting food product from the underside of the supply held in the container and screw feeding the cut product to said chamber means.

* * * * *

UNITED STATES PATENT AND TRADEMARK OFFICE
CERTIFICATE OF CORRECTION

PATENT NO. : 5,149,551
DATED : September 22, 1992
INVENTOR(S) : David B. Anderson It is certified that error appears in the above-identified patent and that said Letters Patent is hereby corrected as shown below:

Column 11, claim 1, line 37, "product an for" should read ---product and for---.

Signed and Sealed this

Fifth Day of October, 1993

Attest:

BRUCE LEHMAN

*Attesting Officer*  *Commissioner of Patents and Trademarks*